United States Patent
Zhang et al.

(10) Patent No.: US 11,756,288 B2
(45) Date of Patent: Sep. 12, 2023

(54) IMAGE PROCESSING METHOD AND APPARATUS, ELECTRONIC DEVICE AND STORAGE MEDIUM

(71) Applicant: BAIDU USA LLC, Sunnyvale, CA (US)

(72) Inventors: Xinyang Zhang, Sunnyvale, CA (US); Zhisheng Hu, Sunnyvale, CA (US); Zhenyu Zhong, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 136 days.

(21) Appl. No.: 17/569,232

(22) Filed: Jan. 5, 2022

(65) Prior Publication Data
US 2022/0130139 A1 Apr. 28, 2022

(51) Int. Cl.
*G06K 9/00* (2022.01)
*G06V 10/774* (2022.01)
*G06T 5/50* (2006.01)

(52) U.S. Cl.
CPC .......... *G06V 10/7747* (2022.01); *G06T 5/50* (2013.01); *G06T 2207/10048* (2013.01);
(Continued)

(58) Field of Classification Search
CPC ............ G06V 10/7747; G06T 5/50; G06T 2207/10048; G06T 2207/20081; G06T 2207/20084; G06T 2207/20221
See application file for complete search history.

(56) References Cited

U.S. PATENT DOCUMENTS

2013/0004081 A1* 1/2013 Baba ............... G06V 20/40
 382/195
2018/0373964 A1* 12/2018 Kondo ............... G06T 5/50
(Continued)

FOREIGN PATENT DOCUMENTS

CN 107527009 A * 12/2017 ......... G06K 9/00362
CN 109977943 A * 7/2019
(Continued)

OTHER PUBLICATIONS

Multi-view traffic sign detection, recognition, and 3D localisation, Radu Timofte et al., Springer, Dec. 2011, pp. 1-15 (Year: 2011).*
(Continued)

*Primary Examiner* — Jayesh A Patel
(74) *Attorney, Agent, or Firm* — Lippes Mathias LLP

(57) ABSTRACT

The present disclosure provides an image processing method and apparatus, an electronic device and a storage medium, which relate to the field of computer technology, and more particularly to artificial intelligence technology including computer vision, deep learning and the like. The image processing method includes: recognizing the image to be processed to determine attribute information of each object included in the image to be processed; determining a target thermal image to be recognized according to the attribute information of each object and the image to be processed; reconstructing the target thermal image to generate a first reconstructed image; and determining whether the image to be processed includes an object of a preset class according to a difference between the first reconstructed image and the target thermal image.

20 Claims, 4 Drawing Sheets

S101 — recognizing the image to be processed to determine attribute information of each object included in the image to be processed S102 — determining a target thermal image to be recognized according to the attribute information of each object and the image to be processed S103 — reconstructing the target thermal image to generate a first reconstructed image S104 — determining whether the image to be processed includes an object of a preset class according to a difference between the first reconstructed image and the target thermal image

(52) U.S. Cl.
CPC .............. *G06T 2207/20081* (2013.01); *G06T 2207/20084* (2013.01); *G06T 2207/20221* (2013.01)

(56) References Cited

U.S. PATENT DOCUMENTS

| | | | | |
|---|---|---|---|---|
| 2019/0020831 A1* | 1/2019 | Hsieh | ................... | H04N 23/45 |
| 2020/0012868 A1* | 1/2020 | Hong | .................... | G06V 20/56 |
| 2020/0065635 A1* | 2/2020 | Lim | ........................ | G06F 18/10 |
| 2020/0191601 A1* | 6/2020 | Jiang | .................... | G01S 13/931 |
| 2020/0342275 A1* | 10/2020 | Weng | ....................... | G06T 3/40 |
| 2021/0012527 A1* | 1/2021 | Shu | ........................ | G06N 3/045 |
| 2021/0097297 A1* | 4/2021 | Ren | ........................ | G06T 5/003 |
| 2021/0218871 A1* | 7/2021 | Peng | ...................... | H04N 23/10 |
| 2021/0406616 A1* | 12/2021 | Yang | ...................... | G06N 3/045 |
| 2022/0284226 A1* | 9/2022 | Lev | ........................ | E01C 23/16 |

FOREIGN PATENT DOCUMENTS

| | | | |
|---|---|---|---|
| CN | 110287492 A | * | 9/2019 |
| CN | 111260594 A | * | 6/2020 |
| CN | 112001868 A | * | 11/2020 |
| CN | 112052787 A | * | 12/2020 | ......... G06K 9/00778 |
| CN | 113743434 A | * | 12/2021 |
| CN | 113781377 A | * | 12/2021 |
| CN | 113869774 A | * | 12/2021 |
| CN | 113870254 A | * | 12/2021 |
| EP | 3675031 A1 | * | 7/2020 | ........... G06K 9/6256 |
| KR | 20180090661 A | * | 8/2018 |
| WO | WO-2016088293 A1 | * | 6/2016 | ............. G06T 5/007 |
| WO | WO-2020048265 A1 | * | 3/2020 | ......... G06K 9/00744 |
| WO | WO-2020113404 A1 | * | 6/2020 | ........... B64C 39/024 |
| WO | WO-2020164282 A1 | * | 8/2020 |
| WO | WO-2021246822 A1 | * | 12/2021 | ........... G06T 3/0093 |

OTHER PUBLICATIONS

Traffic Sign Detection System for Locating Road Intersections and Roundabouts: The Chilean Case, Gabriel Villalón-Sepúlveda et al., MPDI, 2017, pp. 1-21 (Year: 2017).*
Reliable Smart Road Signs, Muhammed O. Sayin et al., IEEE, Dec. 2020, pp. 4995-5009 (Year: 2020).*
Automatic Recognition of Road Signs in Digital Images for GIS Update, Andr'e R. S. Marcal et al., IMAGAPP, 2009, pp. 129-134 (Year: 2009).*

* cited by examiner

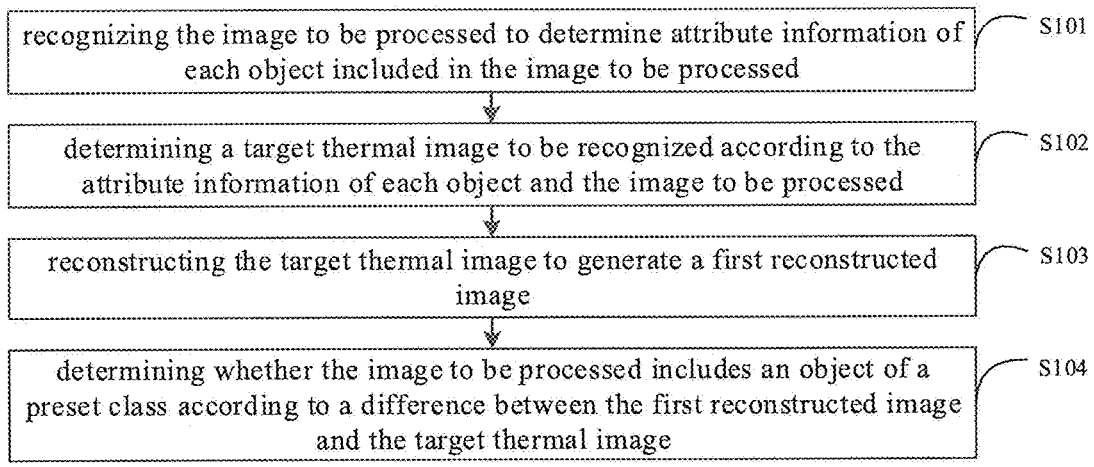
FIG. 1
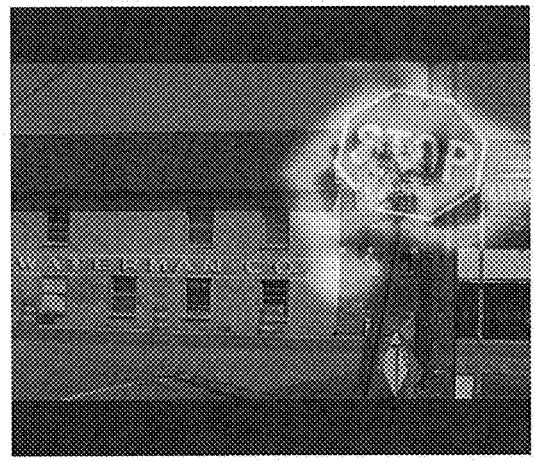
FIG. 2(a)   FIG. 2(b)

IMAGE PROCESSING METHOD AND APPARATUS, ELECTRONIC DEVICE AND STORAGE MEDIUM

TECHNICAL FIELD

The present disclosure relates to the field of computer technology, and more particularly to artificial intelligence technology including computer vision, deep learning and the like. Specifically, the present disclosure relates to an image processing method and apparatus, an electronic device and a storage medium.

BACKGROUND

With the continuous development and improvement, artificial intelligence technology has played an important role in various fields related to people's daily life. For example, artificial intelligence technology has made remarkable progress in the field of image processing. In image processing, if the surface of an object in the image is pasted with other patterns and patches, or is maliciously tampered with by graffiti, it may be difficult to accurately recognize the object in the image, which may lead to errors or deviations in subsequent decision-making. Therefore, how to accurately determine whether the image contains malicious content has become a key research direction.

SUMMARY

Embodiments of the present disclosure seek to solve at least one of the problems existing in the related art to at least some extent.

For this, embodiments of the present disclosure provide an image processing method and apparatus, an electronic device and a storage medium.

In a first aspect of embodiments of the present disclosure, there is provided an image processing method, including: recognizing an image to be processed to determine attribute information of each object included in the image to be processed; determining a target thermal image to be recognized according to the attribute information of each object and the image to be processed; reconstructing the target thermal image to generate a first reconstructed image; and determining whether the image to be processed includes an object of a preset class according to a difference between the first reconstructed image and the target thermal image.

In a second aspect of embodiments of the present disclosure, there is provided an image processing apparatus, including: a first determining module, configured to recognize an image to be processed to determine attribute information of each object included in the image to be processed; a second determining module, configured to determine a target thermal image to be recognized according to the attribute information of each object and the image to be processed; a first generating module, configured to reconstruct the target thermal image to generate a first reconstructed image; and a third determining module, configured to determine whether the image to be processed includes an object in of a preset class according to a difference between the first reconstructed image and the target thermal image.

In a third aspect of embodiments of the present disclosure, there is provided an electronic device, including: at least one processor; and a memory, in communication with the at least one processor and having stored therein instructions executable by the at least one processor, wherein the instructions, when executed by the at least one processor, cause the at leak one processor to execute the image processing method as described in any embodiment of the first aspect of the present disclosure.

In a fourth aspect of embodiments of the present disclosure, there is provided a non-transitory computer-readable storage medium, having stored therein computer instructions, wherein the computer instructions are configured to cause a computer to execute the image processing method as described in any embodiment of the first aspect of the present disclosure.

In a fifth aspect of embodiments of the present disclosure, there is provided a computer program product, including computer instructions that, when executed by a processor, cause the image processing method as described in any embodiment of the first aspect of the present disclosure.

It should be appreciated that, the general description hereinbefore and the detail description hereinafter are explanatory and illustrative, not intended to identify key or significant features of embodiments of the present disclosure, and thus shall not be construed to limit the present disclosure. Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The drawings are intended to provide a better understanding of the present disclosure, and shall not be construed to limit the present disclosure. These and other aspects and advantages of embodiments of the present disclosure will become apparent and more readily appreciated from the following descriptions made with reference to the drawings, in which:

FIG. 1 is a schematic flowchart of an image processing method according to an embodiment of the present disclosure.

FIG. 2(a) is a schematic diagram showing a target thermal image when an image to be processed includes an object of a preset class according to an embodiment of the present disclosure.

FIG. 2(b) is a schematic diagram showing a target thermal image when an image to be processed does not include an object of a preset class according to an embodiment of the present disclosure.

DETAILED DESCRIPTION

Figure 3:
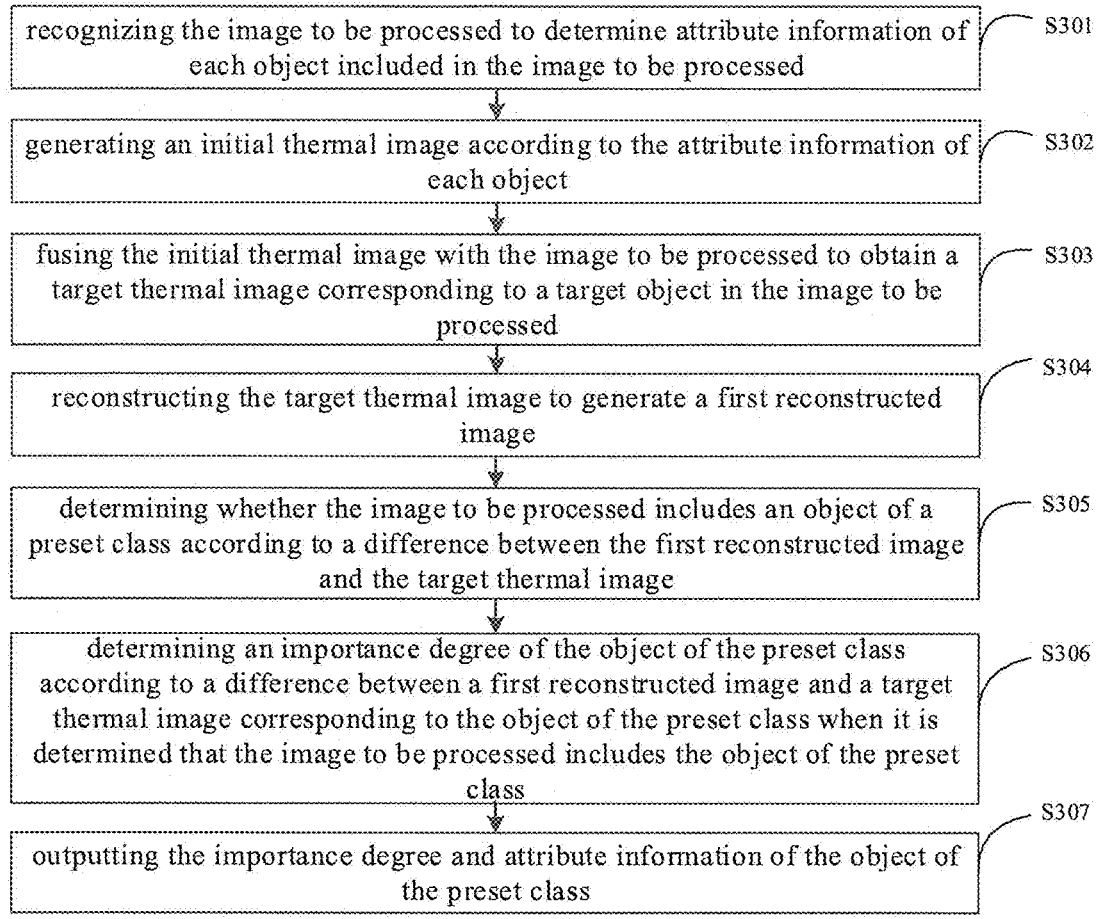
FIG. 3 is a schematic flowchart of an image processing method according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. It will be appreciated to those skilled in the art that, various changes and modifications may be made to the embodiments described herein without departing from the scope and spirit of the present disclosure. Similarly, for clarity and conciseness, information on well-known functions and structures is omitted in the following description.

Embodiments of the present disclosure relate to the field of artificial intelligence technology, including computer vision, deep learning and the like.

Artificial intelligence, abbreviated as AI, is a new technical science that studies and develops theories, methods, technologies and application systems for simulating, extending and expanding human intelligence.

Deep learning is to learn the internal laws and representation levels of sample data. Information obtained in the learning process is of great help to the interpretation of data such as texts, images and sounds. The ultimate goal of deep learning is to enable machines to have analyzing and learning ability like people, and to recognize texts, images, sounds and other data.

Computer vision refers to machine vision that uses cameras and computers instead of human eyes to recognize, track, and measure targets, and uses the computer to further process graphics into images more suitable for human eyes to observe or for instruments to detect.

FIG. 1 is a schematic flowchart of an image processing method according to an embodiment of the present disclosure.

It should be illustrated that, an executive subject of the image processing method according to embodiments of the present disclosure is an image processing apparatus, which may be implemented by software and/or hardware. The image processing apparatus may be configured in an electronic device, and the electronic device may include but not limited to a terminal, a server side, etc.

As illustrated in FIG. 1, the image processing method includes the following operations as illustrated at blocks in FIG. 1.

At block S101, an image to be processed is recognized to determine attribute information of each object included in the image to be processed.

It will be appreciated that, the image to be processed may be an image to be processed currently. The number of the image to be processed may be one or more. The image to be processed may be an image captured by a photographic device with a shooting function, such as a mobile phone or a camera, or the image to be processed may also be obtained by parsing a video stream. For example, the image to be processed may be a video image extracted from several video frames of a video. The form of the image to be processed is not particularly limited herein.

The attribute information of each object may include, but not limited to, a bounding box, classification and confidence of each object.

Alternatively, the image to be processed may be input into and recognized by a pre-trained target recognition model to determine the attribute information of each object included in the image to be processed.

Alternatively, the target recognition model may include, but not limited to, a faster region-convolution neural network (faster R-CNN), a deep learning model and the like, such as a YOLO v3 model based on a real-time detection algorithm YOLO.

It will be appreciated that, the position and size of the bounding box included in the attribute information of each object output by the target recognition model can determine the confidence of the object class output by the model.

At block S102, a target thermal image to be recognized is determined according to the attribute information of each object and the image to be processed.

In embodiments of the present disclosure, interpretability analysis may be performed on each object according to the attribute information corresponding to the object. That is, the influence of each object contained in the image to be processed on the image to be processed is analyzed separately to determine pixels that play an important role in the image to be processed. In embodiments of the present disclosure, interpretability results may be visualized by a thermal image.

The target thermal image can characterize the interpretability result corresponding to each object in the image to be processed. The target thermal image may include the interpretability result(s) corresponding to one or more objects, which is not limited herein.

It will be appreciated that, in order to achieve an effective attack, especially in the physical world, it is often necessary to make a significant change in a limited local area of an object, so that a depth model will produce a recognition error for the object that does not change much from the naked eye. This attack characteristic leads to important pixels of malicious content, i.e., the energy in the target thermal image will be concentrated near the target. Therefore, if the image to be processed does not include an object of a preset class, the heat in the target thermal image will be evenly distributed around the object; if the image to be processed includes the object of the preset class, the heat in the target thermal image will be concentrated near the malicious content in the object of the preset class.

FIG. 2(a) is a schematic diagram showing a target thermal image when an image to be processed includes an object of a preset class according to an embodiment of the present disclosure. FIG. 2(b) is a schematic diagram showing a target thermal image when an image to be processed does not include an object of a preset class according to an embodiment of the present disclosure.

At block S103, the target thermal image is reconstructed to generate a first reconstructed image.

Alternatively, the target thermal image may be input into a preset autoencoder, and the autoencoder performs dimensionality reduction and reconstruction on the target thermal image to generate the first reconstructed image.

It will be appreciated that the target thermal image is input into the preset autoencoder, so that the target thermal image is processed by the autoencoder to generate the first reconstructed image. In this way, acquisition logic of the first reconstructed image can be simplified, the efficiency of acquiring the first reconstructed image can be effectively improved, and the accuracy of the acquired first reconstructed image can be improved.

Alternatively, principal component analysis (PCA) may also be used to perform the dimensionality reduction and reconstruction on the target thermal image to generate the first reconstructed image.

At block S104, it is determined whether the image to be processed includes an object of a preset class according to a difference between the first reconstructed image and the target thermal image.

The object of the preset class may be an object containing malicious content, i.e., an object that has been maliciously tampered with, or an object that is difficult to recognize due to other patterns or patches pasted on its surface. For example, in an application scenario of autonomous driving, the object of the preset class may include a traffic sign changed by graffiti, a malicious advertising patch on the back of a vehicle, etc. It will be appreciated that the form of the object of the preset class is not particularly limited herein.

In an embodiment, a difference threshold may be set, and when the difference between the first reconstructed image and the target thermal image is less than the difference threshold, it is determined that the image to be processed includes the object of the preset class.

In embodiments of the present disclosure, the image to be processed is recognized to determine the attribute information of each object included in the image to be processed, the target thermal image to be recognized is determined according to the attribute information of each object and the image to be processed, and then the target thermal image is reconstructed to generate the first reconstructed image, and finally it is determined whether the image to be processed includes the object of the preset class according to the difference between the first reconstructed image and the target thermal image. Therefore, through interpretability analysis and processing of the image to be processed, it can be accurately determined whether the image to be processed includes malicious content, thereby providing conditions for improving the accuracy and reliability of image recognition.

FIG. 3 is a schematic flowchart of an image processing method according to an embodiment of the present disclosure. As shown in FIG. 3, the image processing method includes the following operations as illustrated at blocks in FIG. 3.

At block S301, an image to be processed is recognized to determine attribute information of each object included in the image to be processed.

For the specific implementations of the operation as illustrated at block S301, please refer to the related content described in detail in other embodiments of the present disclosure, which will not be elaborated here.

At block S302, an initial thermal image is generated according to the attribute information of each object.

At block S303, the initial thermal image is fused with the image to be processed to obtain the target thermal image corresponding to a target object in the image to be processed.

In embodiments of the present disclosure, pixels in the image to be processed that play an important role in the recognition result of the image may be determined first according to the classification as well as the position and size of the bounding box of each object output by the detection model, and then a corresponding initial thermal image is generated.

Afterwards, the initial thermal image is fused with the image to be processed to shield unimportant pixels in the image to be processed, and then the fused image is subjected to object recognition and thermal image generation, so as to make the obtained target thermal image corresponding to the target object in the image to be processed more accurate.

Figure 4:
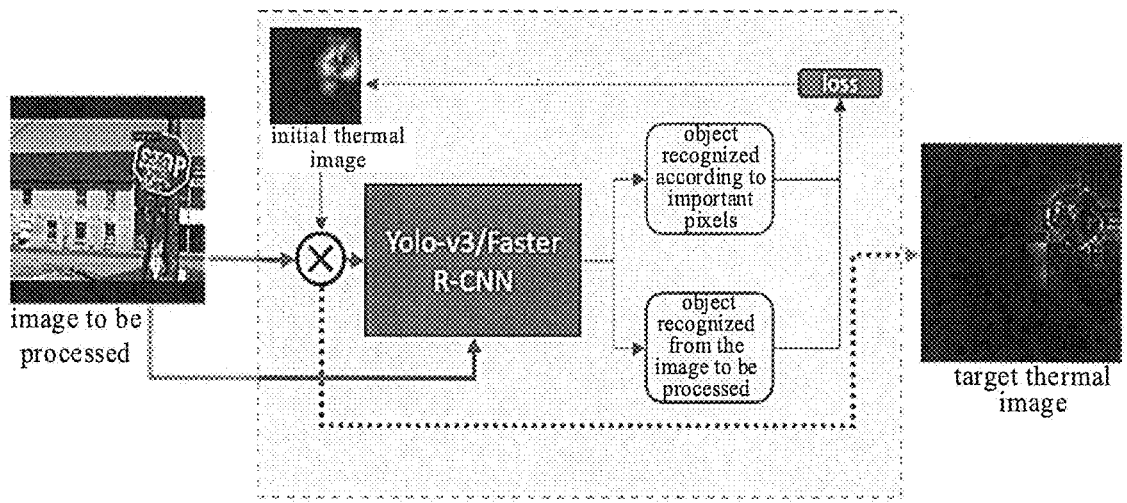
FIG. 4 is a schematic diagram for illustrating a process for determining a target thermal image according to an embodiment of the present disclosure.

In embodiments of the present disclosure, there is provided a process for determining a target thermal image. FIG. 4 is a schematic diagram for illustrating a process for determining a target thermal image according to an embodiment of the present disclosure.

As shown in FIG. 4, an image to be processed is input into a target recognition model (faster R-CNN or YOLO-v3) to determine attribute information of each object included in the image to be processed, an initial thermal image m' is generated according to the attribute information of each object, the initial thermal image m' is fused with the image to be processed to shield unimportant pixels in the image to be processed, and then the fused image is input into the target recognition model to obtain an object recognized only according to important pixels, the object obtained by recognizing the image to be processed is compared with the object recognized only according to the important pixels to determine a loss value based on the comparison result, and then the initial thermal image is updated according to the loss value, so as to iterate and optimize the initial thermal image, until the comparison result reaches a specified threshold, and finally the target thermal image corresponding to the target object in the image to be processed is obtained.

Alternatively, the important pixels may also be determined according to the change of the confidence of the object in the iterative optimization process of the thermal image, so as to make the determined target thermal image more accurate.

At block S304, the target thermal image is reconstructed to generate a first reconstructed image.

At block S305, it is determined whether the image to be processed includes an object of a preset class according to a difference between the first reconstructed image and the target thermal image.

For specific implementations of the operations as illustrated at blocks S304 and S305, please refer to the related content described in detail in other embodiments of the present disclosure, which will not be elaborated here.

At block S306, an importance degree of the object of the preset class is determined according to a difference between a first reconstructed image and a target thermal image corresponding to the object of the preset class when it is determined that the image to be processed includes the object of the preset class.

In embodiments of the present disclosure, the importance degree of the object of the preset class included in the image to be processed may be a degree of influence of the object of the preset class on later processing or a degree of risk that may cause an error in later decision-making.

It will be appreciated that since the first reconstructed image is reconstructed based on the malicious content contained in the target thermal image, the smaller the difference between the first reconstructed image and the target thermal image is, indicating that the more important the object of the preset class is in the later processing.

In embodiments of the present disclosure, after it is determined that the image to be processed includes the object of the preset class, the importance degree of the object of the preset class may be determined according to the difference between the first reconstructed image and the target thermal image corresponding to the object of the preset class. In this way, the later stage may perform a deeper analysis of the object of the preset class according to the importance degree of the object of the preset class, so as to avoid that the later-stage resources are occupied by a less important object, resulting in an object with high importance degree cannot be recognized in time, thereby saving the later-stage resources and improving the processing efficiency of the later stage.

Alternatively, the attribute information of the object of the preset class included in the image to be processed may also be input into a pre-trained deep learning model to obtain the importance degree corresponding to the object of the preset class. Alternatively, the importance degree corresponding to the object of the preset class may also be determined according to the attribute information of the object of the preset class based on a preset rule.

At block S307, the importance degree and attribute information of the object of the preset class are output.

It will be appreciated that the importance degree and attribute information of the object of the preset class may be output for use by a later-stage application. For example, in an application scenario of automatic driving, an automatic driving strategy may be adjusted based on the importance degree and attribute information of the object of the preset class to prevent mistakes or errors in the automatic driving strategy caused by the malicious content contained in the image to be processed, such as changed traffic signs by graffiti or malicious advertising patches on the back of vehicles, etc.

In embodiments of the present disclosure, the attribute information of each object included in the image to be processed is determined, the target thermal image corresponding to the target object in the image to be processed is acquired according to the attribute information of each object, the target thermal image is reconstructed to generate the first reconstructed image, it is determined whether the image to be processed includes the object of the preset class according to the difference between the first reconstructed image and the target thermal image, the importance degree of the object of the preset class is determined according to the difference between the first reconstructed image and the target thermal image corresponding to the object of the preset class when it is determined that the image to be processed includes the object of the preset class, and the importance degree and attribute information of the object of the preset class are output. Therefore, after it is determined whether the image to be processed includes the object of the preset class through the interpretability analysis of the image to be processed, the importance degree and attribute information of the object of the preset class are output, which not only provides conditions for accurately determining the recognition results of the image to be processed, but also provides a reliable basis for the later-stage processing strategy.

From the above analysis, it can be seen that the autoencoder can be used in the present disclosure to reconstruct the target thermal image to generate the first reconstructed image. In the following, the generation process of the autoencoder will be described in detail with reference to FIG. 5.

Figure 5:
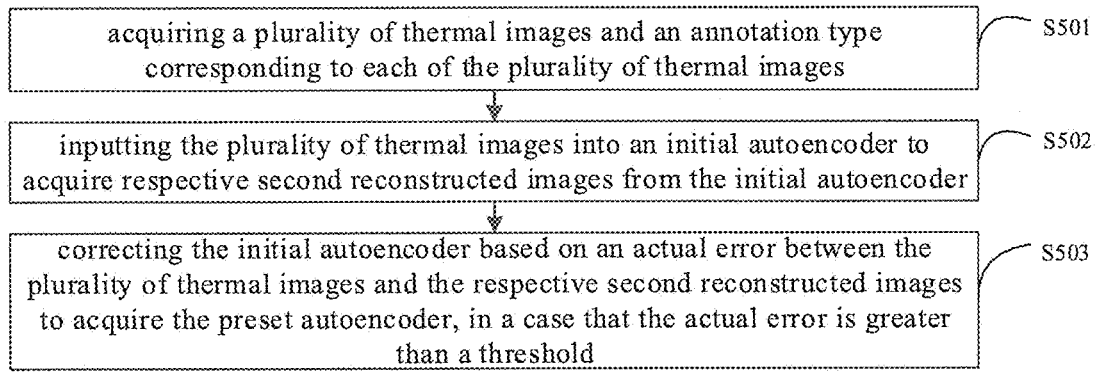
FIG. 5 is a schematic flowchart of an image processing method according to an embodiment of the present disclosure.

FIG. 5 is a schematic flowchart of an image processing method according to an embodiment of the present disclosure. As shown in FIG. 5, the image processing method includes the following operations as illustrated at blocks in FIG. 5.

At block S501, a plurality of thermal images and an annotation type corresponding to each of the plurality of thermal images are acquired.

Alternatively, an initial training dataset may be acquired, which includes a plurality of images and attribute information of an object included in each of the plurality of images; the plurality of images are processed using noise data according to the attribute information of the object included in each of the plurality of images to obtain a plurality of images containing noise; the plurality of images containing noise are processed to obtain the plurality of thermal images; and the annotation type corresponding to each of the plurality of thermal images is determined according to the type of the noise data.

It should be illustrated that, as interpretability results corresponding to an object containing malicious content are distributed more concentrated as compared with that corresponding to a normal object (i.e., an object not containing the malicious content), and the thermal image corresponding to the object containing the malicious content is similar to a pattern corresponding to noise of Gaussian distribution, the images in the initial training dataset may be processed using noise of random Gaussian distribution to obtain the images containing noise.

Alternatively, the images in the initial training dataset may also be processed based on noise of normal distribution, uniform distribution or binomial distribution, which is not particularly limited herein.

Alternatively, different types of noise data may correspond to the same or different annotation types, which is not particularly limited herein.

For example, a "vehicle" in an image may be processed using noise data of normal distribution according to the attribute information corresponding to the object included in the image to obtain an image containing noise, the image containing noise is processed to obtain a thermal image, and then based on the type of the noise data, the annotation type corresponding to the thermal image may be determined as "containing abnormal content".

For another example, a "traffic sign" in an image may be processed using noise data of uniform distribution according to the attribute information corresponding to the object included in the image to obtain an image containing noise, the image containing noise is processed to obtain a thermal image, and then based on the type of the noise data, the annotation type corresponding to the thermal image may be determined as "not containing abnormal content".

It should be illustrated that the above examples are only explanatory and illustrative, and cannot be used as specific limitations on the type of the noise data, the annotation type and the like in embodiments of the present disclosure.

Alternatively, in the present disclosure, for different types of malicious content, such as different patch content, different graffiti content and the like, different types of noise data may be used to process the images to obtain the images containing noise. In this way, the trained autoencoder is able to recognize different types of attack, thereby improving the ability and accuracy of the autoencoder to detect malicious attack.

For example, the noise of normal distribution corresponds to an annotation type "patch attack"; and the noise of Gaussian distribution may correspond to an annotation type "graffiti attack".

In embodiments of the present disclosure, the objects in the images are processed based on noise to obtain sample images containing malicious content, so that even if the data volume of the malicious content contained in the initial training dataset is insufficient, the training dataset may be expanded by the noise.

Alternatively, the noise data may also be used directly to generate the plurality of thermal images, and the thermal images generated by different types of noise data correspond to different annotation types.

For example, a thermal image generated using the noise data of normal distribution may correspond to an annotation type "containing abnormal content"; and a thermal image generated using the noise data of uniform distribution may correspond to an annotation type "not containing abnormal content". It will be appreciated that the present disclosure is not limited thereto.

In embodiments of the present disclosure, different types of noise data are used directly to obtain thermal images containing abnormal content, thereby making up for the defects that sample images containing different types of malicious content are difficult to obtain and their coverage is incomplete. That is, even if the volume of normal training data is not enough, thermal images corresponding to different types of malicious content may also be acquired as training data using different types of noise data.

At block S502, the plurality of thermal images are input into an initial autoencoder to acquire respective second reconstructed images from the initial autoencoder.

The autoencoder is a variant of an artificial neural network, which is usually used to learn effective data encoding in an unsupervised manner. The autoencoder usually first learns the encoding of a set of data from input data, and then learns the representation of the input data and reconstructs the input data in a very similar way. In the present disclosure, the autoencoder first learns the data representation in the thermal images, then performs operations like dimensionality reduction and reconstruction on the thermal images, and then outputs the respective second reconstructed images corresponding to the thermal images.

It will be appreciated that the initial autoencoder is an autoencoder that has not been trained yet.

At block S503, the initial autoencoder is corrected based on an actual error between the plurality of thermal images and the respective second reconstructed images to acquire the preset autoencoder, in a case that the actual error between the plurality of thermal images and the respective second reconstructed images is greater than a threshold.

It will be appreciated that when the actual error between the plurality of thermal images and the respective second reconstructed images is greater than the threshold, the initial autoencoder is corrected based on the actual error, so that the initial autoencoder is iterated and optimized according to the training data, thereby improving the robustness and convergence of the autoencoder, and improving the accuracy of the first reconstructed image acquired from the trained autoencoder.

In embodiments of the present disclosure, the plurality of thermal images and the annotation type corresponding to each of the plurality of thermal images are acquired, the plurality of thermal images are input into the initial autoencoder to acquire respective second reconstructed images from the initial autoencoder, and the initial autoencoder is corrected based on the actual error between the plurality of thermal images and the respective second reconstructed images to acquire the preset autoencoder, in the case that the actual error is greater than the threshold. In this way, the initial autoencoder is trained according to the plurality of thermal images and the annotation type corresponding to each of the plurality of thermal images to obtain the preset auto encoder, thereby providing conditions for obtaining the first reconstructed image corresponding to the target thermal image by using the preset autoencoder.

Figure 6:
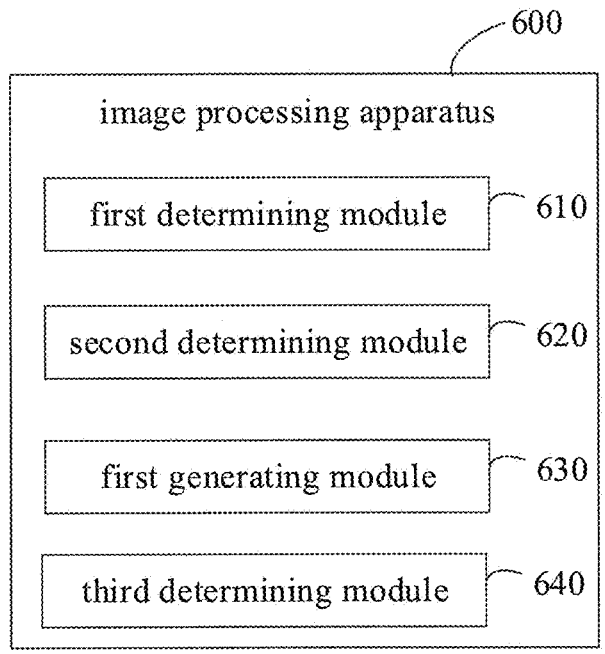
FIG. 6 is a schematic block diagram of an imaging processing apparatus according to an embodiment of the present disclosure.

FIG. 6 is a schematic block diagram of an imaging processing apparatus according to an embodiment of the present disclosure. As shown in FIG. 6, the imaging processing apparatus includes a first determining module 610, a second determining module 620, a first generating module 630 and a third determining module 640.

The first determining module 610 is configured to recognize an image to be processed to determine attribute information of each object included in the image to be processed.

The second determining module 620 is configured to determine a target thermal image to be recognized according to the attribute information of each object and the image to be processed.

The first generating module 630 is configured to reconstruct the target thermal image to generate a first reconstructed image.

The third determining module 640 is configured to determine whether the image to be processed includes an object of a preset class according to a difference between the first reconstructed image and the target thermal image.

In some embodiments of the present disclosure, the second determining module 620 is further configured to: generate an initial thermal image according to the attribute information of each object; and fuse the initial thermal image with the image to be processed to obtain the target thermal image corresponding to a target object in the image to be processed.

In some embodiments of the present disclosure, the first generating module 630 includes a first generating unit, and the first generating unit is configured to input the target thermal image into a preset autoencoder to acquire the first reconstructed image from the preset autoencoder.

In some embodiments of the present disclosure, the first generating module 630 further includes a first acquiring unit, a second acquiring unit and a third acquiring unit.

The first acquiring unit is configured to acquire a plurality of thermal images and an annotation type corresponding to each of the plurality of thermal images.

The second acquiring unit is configured to input the plurality of thermal images into an initial autoencoder to acquire respective second reconstructed images from the initial autoencoder.

The third acquiring unit is configured to correct the initial autoencoder based on an actual error between the plurality of thermal images and the respective second reconstructed images to acquire the preset autoencoder, in a case that the actual error between the plurality of thermal images and the respective second reconstructed images is greater than a threshold.

In some embodiments of the present disclosure, the first acquiring unit is further configured to: acquire an initial training dataset which includes a plurality of images and attribute information of an object included in each of the plurality of images; process the plurality of images using noise data according to the attribute information of the object included in each of the plurality of images to obtain a plurality of images containing noise; process the plurality of images containing noise to obtain the plurality of thermal images; and determine the annotation type corresponding to each of the plurality of thermal images according to the type of the noise data.

In some embodiments of the present disclosure, the image processing apparatus further includes a fourth determining module and an outputting module.

The fourth determining module is configured to determine an importance degree of the object of the preset class according to a difference between a first reconstructed image and a target thermal image corresponding to the object of the preset class, when it is determined that the image to be processed includes the object of the preset class.

The outputting module is configured to output the importance degree and attribute information of the object of the preset class.

It should be illustrated that, the descriptions and explanations made hereinbefore for embodiments of the image processing method are also applicable to the embodiments of the image processing apparatus, which will not be elaborated herein.

In embodiments of the present disclosure, the image to be processed is recognized to determine the attribute information of each object included in the image to be processed, the target thermal image to be recognized is determined according to the attribute information of each object and the image to be processed, and then the target thermal image is reconstructed to generate the first reconstructed image, and finally it is determined whether the image to be processed includes the object of the preset class according to the difference between the first reconstructed image and the target thermal image. Therefore, through interpretability analysis and processing of the image to be processed, it can be accurately determined whether the image to be processed includes malicious content, thereby providing conditions for improving the accuracy and reliability of image recognition.

In embodiments of the present disclosure, there is provided an electronic device. The electronic device includes at least one processor and a memory. The memory is in communication with the at least one processor and has stored therein instructions executable by the at least one processor. The instructions, when executed by the at least one processor, cause the at least one processor to execute the imaging processing method as described in embodiments of the present disclosure hereinbefore.

In embodiments of the present disclosure, there is provided a non-transitory computer-readable storage medium having stored therein computer instructions. The computer instructions are configured to cause a computer to execute the imaging processing method as described in embodiments of the present disclosure hereinbefore.

In embodiments of the present disclosure, there is provided a computer program product, including computer instructions that, when executed by a processor, cause the imaging processing method as described in embodiments of the present disclosure hereinbefore to be performed.

Figure 7:
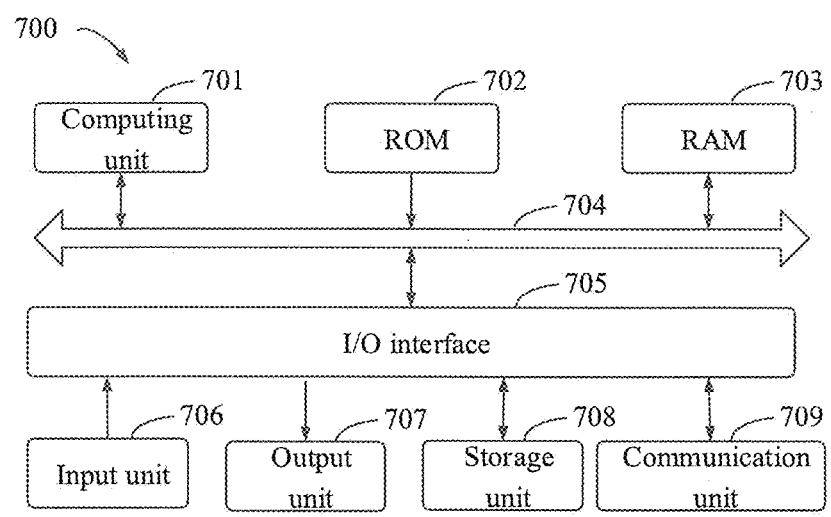
FIG. 7 is a schematic block diagram of an electronic device for implementing an image processing method according to an embodiment of the present disclosure.

FIG. 7 shows a schematic block diagram of an example electronic device 700 that can be used to implement embodiments of the present disclosure. The electronic device is intended to represent various forms of digital computers, such as a laptop computer, a desktop computer, a workstation, a personal digital assistant, a server, a blade server, a mainframe computer and other suitable computers. The electronic device can also represent various forms of mobile apparatuses, such as personal digital processing, a cellular phone, a smart phone, a wearable device and other similar computing apparatuses. The components shown herein, their connections and relationships as well as their functions are merely examples, and are not intended to limit the implementation of the present disclosure described and/or required herein.

As shown in FIG. 7, the device 700 includes a computing unit 701, which can perform various suitable actions and processing according to a computer program stored in a read-only memory (ROM) 702 or a computer program loaded from a storage unit 708 to a random access memory (RAM) 703. In the RAM 703, various programs and data required for operations of the device 700 may also be stored. The computing unit 701, the ROM 702 and the RAM 703 are connected to each other through a bus 704. An input/output (I/O) interface 705 is also connected to the bus 704.

Multiple components in the device 700 are connected to the I/O interface 705, including: an input unit 706, such as a keyboard, a mouse, etc.; an output unit 707, such as various types of displays, speakers, etc.; and the storage unit 708, such as a disk, an optical disc, etc.; and a communication unit 709, such as a network card, a modem, a wireless communication transceiver, etc. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include, but are not limited to, a central processing unit (CPU), a graphics processing unit (GPU), various dedicated artificial intelligence (AI) computing chips, various computing units that run machine learning model algorithms, a digital signal processor (DSP), and any suitable processor, controller, microcontroller, etc. The computing unit 701 executes the various methods and processes described above, such as the image processing method. For example, in some embodiments, the image processing method may be implemented as a computer software program, which is tangibly contained in a machine-readable medium, such as the storage unit 708. In some embodiments, part or all of the computer program may be loaded and/or installed onto the device 700 via the ROM 702 and/or the communication unit 709. When the computer program is loaded into the RAM 703 and executed by the computing unit 701, one or more steps of the image processing method described above can be executed. Alternatively, in other embodiments, the computing unit 701 may be configured to perform the image processing method in any other suitable manner (for example, by means of firmware).

The above various embodiments of the systems and technologies described herein can be implemented in a digital electronic circuit system, an integrated circuit system, a field programmable gate array (FPGA), an application specific integrated circuit (ASIC), an application-specific standard product (ASSP), a system of a system on chip (SOC), a load programmable logic device (CPLD), a computer hardware, firmware, software, and/or a combination thereof. These various embodiments may include: being implemented in one or more computer programs, which may be executed and/or interpreted on a programmable system including at least one programmable processor, the programmable processor may be a dedicated or general-purpose programmable processor that can receive data and instructions from a storage system, at least one input device and at least one output device, and transmit data and instructions to the storage system, the at least one input device and the at least one output device.

The program codes used to implement the method of the present disclosure can be written in any combination of one or more programming languages. These program codes can be provided to a processor or controller of a general-purpose computer, a special-purpose computer or other programmable data processing devices, so that when the program codes are executed by the processor or controller, the functions/operations specified in the flowcharts and/or block diagrams are implemented. The program codes can be executed entirely on a machine, partly executed on a machine, partly executed on a machine and partly executed on a remote machine as an independent software package, or entirely executed on a remote machine or a server.

In the context of the present disclosure, a machine-readable medium may be a tangible medium, which may contain or store a program for use by an instruction execution system, an apparatus or a device or for use in combination with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared or semiconductor system, an apparatus or a device or any suitable combination of the foregoing. More specific examples of the machine-readable storage medium may include electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combination of the foregoing.

In order to provide interaction with a user, the systems and technologies described here can be implemented on a computer, which has: a display apparatus for displaying information to the user (for example, a CRT (cathode ray tube) or LCD (liquid crystal display) monitor); and a keyboard and pointing apparatus (for example, a mouse or a trackball), through which the user can provide input to the computer. Other types of apparatuses can also be used to provide interaction with the user; for example, the feedback provided to the user can be any form of sensory feedback (for example, visual feedback, auditory feedback or tactile feedback); and input from the user can be received in any form (including acoustic input, voice input or tactile input).

The systems and technologies described here can be implemented in a computing system that includes back-end components (for example, as a data server), or a computing system that includes middleware components (for example, an application server), or a computing system that includes front-end components (for example, a user computer with a graphical user interface or a web browser, through which the user can interact with the embodiments of the systems and technologies described herein), or a computing system that includes any combination of such back-end components, middleware components or front-end components. The components of the system can be connected to each other through any form or medium of digital data communication (for example, a communication network). Examples of the communication network include: a local area network (LAN), a wide area network (WAN), the Internet, and a blockchain network.

The computer system may include a client and a server. The client and the server are generally far away from each other and usually interact through a communication network. The relationship between the client and the server will be generated by a computer program that runs on a corresponding computer and has a client-server relationship with each other. The server may be a cloud server, also known as a cloud computing server or a cloud host, which is a host product in a cloud computing service system to solve the defect of difficult management and weak business scalability existed in the traditional physical host and VPS service ("Virtual Private Server", or "VPS" for short). The server may also be a server of a distributed system, or a server combined with a blockchain.

In embodiments of the present disclosure, the image to be processed is recognized to determine the attribute information of each object included in the image to be processed, the target thermal image to be recognized is determined according to the attribute information of each object and the image to be processed, and then the target thermal image is reconstructed to generate the first reconstructed image, and finally it is determined whether the image to be processed includes the object of the preset class according to the difference between the first reconstructed image and the target thermal image. Therefore, through interpretability analysis and processing of the image to be processed, it can be accurately determined whether the image to be processed includes malicious content, thereby providing conditions for improving the accuracy and reliability of image recognition.

It should be understood that the various forms of flows shown above can be used to reorder, add or delete steps. For example, the respective steps described in the present disclosure may be executed in parallel, or also may be executed sequentially, or also may be executed in a different order, which will be not limited herein, as long as the desired result of the technical solution disclosed in the present disclosure can be achieved.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, such as two or three, unless specified otherwise. As used herein, the term "if" may be construed to mean "when" or "upon" or "in response to determining" or "in a case that" or "when it is determined that".

The foregoing specific embodiments do not constitute limitation on the protection scope of the present disclosure. Those skilled in the art should understand that various modifications, combinations, sub-combinations and substitutions can be made according to design requirements and other factors. Any modification, equivalent replacement, improvement and the like made within the spirit and principle of the present disclosure shall be included in the protection scope of the present disclosure.

What is claimed is:

1. An image processing method, comprising:
   recognizing an image to be processed to determine attribute information of each object included in the image to be processed;
   determining a target thermal image to be recognized according to the attribute information of each object and the image to be processed;
   reconstructing the target thermal image to generate a first reconstructed image; and
   determining whether the image to be processed includes an object of a preset class according to a difference between the first reconstructed image and the target thermal image.

2. The image processing method according to claim 1, wherein determining the target thermal image to be recognized according to the attribute information of each object and the image to be processed comprises:
   generating an initial thermal image according to the attribute information of each object; and
   fusing the initial thermal image with the image to be processed to obtain the target thermal image corresponding to a target object in the image to be processed.

3. The image processing method according to claim 1, wherein reconstructing the target thermal image to generate the first reconstructed image comprises:
   inputting the target thermal image into a preset autoencoder to acquire the first reconstructed image from the preset autoencoder.

4. The image processing method according to claim 3, further comprising:
   acquiring a plurality of thermal images and an annotation type corresponding to each of the plurality of thermal images;
   inputting the plurality of thermal images into an initial autoencoder to acquire respective second reconstructed images from the initial autoencoder;
   correcting the initial autoencoder based on an actual error between the plurality of thermal images and the respective second reconstructed images to acquire the preset autoencoder, in a case that the actual error between the plurality of thermal images and the respective second reconstructed images is greater than a threshold.

5. The image processing method according to claim 4, wherein acquiring the plurality of thermal images and the annotation type corresponding to each of the plurality of thermal images comprises:
   acquiring an initial training dataset, the initial training dataset comprising a plurality of images and attribute information of an object included in each of the plurality of images;
   processing the plurality of images using noise data according to the attribute information of the object included in each of the plurality of images to obtain a plurality of images containing noise;
   processing the plurality of images containing noise to obtain the plurality of thermal images; and
   determining the annotation type corresponding to each of the plurality of thermal images according to the type of the noise data.

6. The image processing method according to claim 1, further comprising:
   determining an importance degree of the object of the preset class according to a difference between a first reconstructed image and a target thermal image corresponding to the object of the preset class; and
   outputting the importance degree and attribute information of the object of the preset class.

7. The image processing method according to claim 2, further comprising:
   determining an importance degree of the object of the preset class according to a difference between a first reconstructed image and a target thermal image corresponding to the object of the preset class; and
   outputting the importance degree and attribute information of the object of the preset class.

8. The image processing method according to claim 3, further comprising:
   determining an importance degree of the object of the preset class according to a difference between a first reconstructed image and a target thermal image corresponding to the object of the preset class; and
   outputting the importance degree and attribute information of the object of the preset class.

9. An electronic device, comprising:
   at least one processor; and
   a memory, in communication with the at least one processor and having stored therein instructions executable by the at least one processor,
   wherein the instructions, when executed by the at least one processor, cause the at least one processor to:
   recognize an image to be processed to determine attribute information of each object included in the image to be processed;
   determine a target thermal image to be recognized according to the attribute information of each object and the image to be processed;
   reconstruct the target thermal image to generate a first reconstructed image; and
   determine whether the image to be processed includes an object of a preset class according to a difference between the first reconstructed image and the target thermal image.

10. The electronic device according to claim 9, wherein the instructions, when executed by the at least one processor, cause the at least one processor to:
    generate an initial thermal image according to the attribute information of each object; and
    fuse the initial thermal image with the image to be processed to obtain the target thermal image corresponding to a target object in the image to be processed.

11. The electronic device according to claim 9, wherein the instructions, when executed by the at least one processor, cause the at least one processor to: input the target thermal image into a preset autoencoder to acquire the first reconstructed image from the preset autoencoder.

12. The electronic device according to claim 11, wherein the instructions, when executed by the at least one processor, cause the at least one processor to:
    acquire a plurality of thermal images and an annotation type corresponding to each of the plurality of thermal images;
    input the plurality of thermal images into an initial autoencoder to acquire respective second reconstructed images from the initial autoencoder;
    correct the initial autoencoder based on an actual error between the plurality of thermal images and the respective second reconstructed images to acquire the preset autoencoder, in a case that the actual error between the plurality of thermal images and the respective second reconstructed images is greater than a threshold.

13. The electronic device according to claim 12, wherein the instructions, when executed by the at least one processor, cause the at least one processor to:
    acquire an initial training dataset, the initial training dataset comprising a plurality of images and attribute information of an object included in each of the plurality of images;
    process the plurality of images using noise data according to the attribute information of the object included in each of the plurality of images to obtain a plurality of images containing noise;
    process the plurality of images containing noise to obtain the plurality of thermal images; and
    determine the annotation type corresponding to each of the plurality of thermal images according to the type of the noise data.

14. The electronic device according to claim 9, wherein the instructions, when executed by the at least one processor, cause the at least one processor to:
    determine an importance degree of the object of the preset class according to a difference between a first reconstructed image and a target thermal image corresponding to the object of the preset class; and
    output the importance degree and attribute information of the object of the preset class.

15. A non-transitory computer-readable storage medium, having stored therein computer instructions, wherein the computer instructions are configured to cause a computer to execute an image processing method, comprising:
    recognizing an image to be processed to determine attribute information of each object included in the image to be processed;
    determining a target thermal image to be recognized according to the attribute information of each object and the image to be processed;
    reconstructing the target thermal image to generate a first reconstructed image; and
    determining whether the image to be processed includes an object of a preset class according to a difference between the first reconstructed image and the target thermal image.

16. The non-transitory computer-readable storage medium according to claim 15, wherein determining the target thermal image to be recognized according to the attribute information of each object and the image to be processed comprises:

generating an initial thermal image according to the attribute information of each object; and fusing the initial thermal image with the image to be processed to obtain the target thermal image corresponding to a target object in the image to be processed.

17. The non-transitory computer-readable storage medium according to claim 15, wherein reconstructing the target thermal image to generate the first reconstructed image comprises:

inputting the target thermal image into a preset autoencoder to acquire the first reconstructed image from the preset autoencoder.

18. The non-transitory computer-readable storage medium according to claim 17, wherein the image processing method further comprises:

acquiring a plurality of thermal images and an annotation type corresponding to each of the plurality of thermal images;

inputting the plurality of thermal images into an initial autoencoder to acquire respective second reconstructed images from the initial autoencoder;

correcting the initial autoencoder based on an actual error between the plurality of thermal images and the respective second reconstructed images to acquire the preset autoencoder, in a case that the actual error between the plurality of thermal images and the respective second reconstructed images is greater than a threshold.

19. The non-transitory computer-readable storage medium according to claim 18, wherein acquiring the plurality of thermal images and the annotation type corresponding to each of the plurality of thermal images comprises:

acquiring an initial training dataset, the initial training dataset comprising a plurality of images and attribute information of an object included in each of the plurality of images;

processing the plurality of images using noise data according to the attribute information of the object included in each of the plurality of images to obtain a plurality of images containing noise;

processing the plurality of images containing noise to obtain the plurality of thermal images; and determining the annotation type corresponding to each of the plurality of thermal images according to the type of the noise data.

20. The non-transitory computer-readable storage medium according to claim 15, wherein the image processing method further comprises:

determining an importance degree of the object of the preset class according to a difference between a first reconstructed image and a target thermal image corresponding to the object of the preset class; and outputting the importance degree and attribute information of the object of the preset class.

* * * * *